US009148354B2

(12) United States Patent
Johnsson et al.

(10) Patent No.: US 9,148,354 B2
(45) Date of Patent: Sep. 29, 2015

(54) APPARATUS AND METHOD FOR MONITORING OF CONNECTIVITY SERVICES

(75) Inventors: Andreas Johnsson, Uppsala (SE); Catalin Meirosu, Stockholm (SE); Svante Ekelin, Vallentuna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 360 days.

(21) Appl. No.: 13/699,357

(22) PCT Filed: Jun. 28, 2010

(86) PCT No.: PCT/SE2010/050738
§ 371 (c)(1),
(2), (4) Date: Nov. 21, 2012

(87) PCT Pub. No.: WO2012/002849
PCT Pub. Date: Jan. 5, 2012

(65) Prior Publication Data
US 2013/0080633 A1    Mar. 28, 2013

(51) Int. Cl.
*G06F 15/173* (2006.01)
*H04L 12/26* (2006.01)
*H04L 12/24* (2006.01)
*H04L 29/08* (2006.01)

(52) U.S. Cl.
CPC .......... *H04L 43/08* (2013.01); *H04L 29/08081* (2013.01); *H04L 41/50* (2013.01); *H04L 41/5038* (2013.01); *H04L 43/0811* (2013.01); *H04L 67/00* (2013.01)

(58) Field of Classification Search
CPC ..... H04L 43/08; H04L 43/0811; H04L 41/50; H04L 67/00
See application file for complete search history.

(56) References Cited

U.S. PATENT DOCUMENTS

| 6,112,236 | A  | * | 8/2000  | Dollin et al. ................. 709/224 |
| 6,701,342 | B1 | * | 3/2004  | Bartz et al. .................... 709/200 |
| 7,574,323 | B2 | * | 8/2009  | Rappaport et al. ............ 702/182 |
| 8,045,475 | B2 | * | 10/2011 | Mohan .......................... 370/241 |
| 8,223,656 | B2 | * | 7/2012  | Rius I Riu et al. ............ 370/241 |

OTHER PUBLICATIONS

Vigoureux et al., "RFC 5860", May 2010.*

(Continued)

*Primary Examiner* — Wen-Tai Lin
(74) *Attorney, Agent, or Firm* — Christopher & Weisberg, P.A.

(57) ABSTRACT

An apparatus (100), a method (200) and a computer program (910) are provided for monitoring a connectivity service in a transport network (170). The apparatus (100) comprises an obtaining unit (120), adapted to request and obtain, for the connectivity service, a Service Definition and Measurement Points, MPs. The Service Definition comprises a set of measurable parameters. The obtaining unit (120) is further adapted to request and obtain a mapping of each of the measurable parameter(s) to Operation Administration and Monitoring function(s), OAM function(s), of the connectivity service. The obtaining unit (120) is further adapted to request and obtain a mapping of the measurable parameter(s) and OAM-function(s) to which tool(s) to use for measuring the measurable parameter(s) of the connectivity service. The apparatus (100) further comprises a measuring unit (130), adapted to perform measurement of the measurable parameter(s) between the Measurement Points using the tool(s).

16 Claims, 7 Drawing Sheets

(56) References Cited

OTHER PUBLICATIONS

Boote J. et al., "Instantiating a Global Network Measurement Framework", Perfsonar Publications, Jan. 2009, XP002635142.
Brandauer, Christof et al., "Miner—A Measurement Infrastructure for Network Research", Testbeds and Research Infrastructures for the Development of Networks & Communities and Workshops, 2009. Tridentcom 2009. 5th International Conference ON, IEEE, Piscataway, NJ, USA, Apr. 6, 2009, pp. 1-9, XP031460946, ISBN: 978-1-4244-2846-5.
Hanemann, Andreas et al., "PerfSONAR: A Service Oriented Architecture for Multi-domain Network Monitoring", Jan. 1, 2005, Service-Oriented Computing-ICSOC 2005 Lecture Notes in Computer Science; LNCS, Springer, Berlin, DE, pp. 241-254, XP019025538, ISBN: 978-3-540-30817-1.
Reddy, P. et al., "Ethernet Aggregation and Transport Infrastructure OAM and Protection Issues", IEEE Communications Magazine, IEEE Service Center, Piscataway, US, vol. 47, No. 2, Feb. 1, 2009, pp. 152-159, XP011267560, ISSN: 0163-6804, DOI: 10.1109/MCOM.2009.4785395, the whole document.
Varga, Pal et al., "Integration of Service-Level Monitoring with Fault Management for End-to-End Multi-Provider Ethernet Services", IEEE Transactions on Network and Service Management, IEEE, US, vol. 4, No. 1, Jun. 1, 2007, pp. 28-38, XP011187628, ISSN: 1932-4537, DOI: 10.1109/TNSM.2007.030103.
3rd Generation Partnership Project; Technical Specification Group Services and System Aspects; End-to-End Multimedia Services Performance Metrics (Release 9), 3GPP Standard; 3GPP TR 26.944, 3rd Generation Partnership Project (3GPP), Mobile Competence Centre; 650, Route Des Lucioles; F-06921 Sophia-Antipolis Cedex; France, No. V9.0.0, Dec. 10, 2009, pp. 1-60, XP050400676, [retrieved on Dec. 10, 2009] paragraphs 4.1 to 4.4, 7.3, 8.1 to 8.5.
International Search Report and Written Opinion dated May 17, 2011 for International Application No: PCT/SE2010/050738, International Filing Date: Jun. 28, 2010 consisting of 10-pages.
2nd Written Opinion dated Jun. 25, 2012 for International Application No: PCT/SE2010/050738, International Filing Date: Jun. 28, 2010 consisting of 7-pages.
ITU-T, Telecommunication Standardization Sector of ITU, Y.1540_Series Y: Global Information Infrastructure, Internet Protocol Aspects and Next-Generation Networks, Internet protocol aspects—Quality of service and network performance dated Nov. 2007 consisting of 42-pages.
MEF Technical Specification—MEF 6.1, Ethernet Services Definitions—Phase 2, Apr. 2008 consisting of 59-pages.
Yaping Zhu etal. —"Cabernet Connectivity Architecture for Better Network Services", Madrid, Spain, Copyright 2008 ACM 978-1-60558-234-4/08/0012 dated Dec. 9, 2008 consisting of 6-pages.
ITU-T, Telecommunication Standardization Sector of ITU, Y.1540_Amendment_1_Series Y: Global Information Infrastructure, Internet Protocol Aspects and Next-Generation Networks, Internet protocol aspects—Quality of service and network performance dated Mar. 2009 consisting of 20-pages.
MPLS—TP—Wikipedia, the free encyclopedia downloaded from the Internet http://en.wikipedia.org/w/index.php?title=MPLS-TP&oldid=368213735 dated Jun. 15, 2010 consisting of 4-pages.
International Preliminary Report on Patentability dated Sep. 28, 2012 for International Application No. PCT/SE2010/050738, International Filing Date: Jun. 28, 2010 consisting of 20-pages.
Optical Transport Network—Wikipedia, the free encyclopedia downloaded from the Internet http://en.wikipedia.org/w/index.php?title=Optical_Transport_Network&oldid=36937 dated Jun. 21, 2010 consisting of 2-pages.
Carrier Ethernet—Wikipedia, the free encyclopedia downloaded from the Internet http://en.wikipedia.org/w/index.php?title=Carrier_Ethernet&oldid=370417284 dated Jun. 27, 2010 consisting of 4-pages.
Seventh Framework Programme, "4WARD—Architecture and Design for the Future Internet" Objective FP7-ICT-2007-1-216041/D-4.3 The Network of the Future Project 216041, D-4.3 In-network management design contains Date of preparation: May 26, 2010 Revision: 2.0, Start date of Project: Aug. 1, 2001 Duration: Jun. 30, 2010, Project Coordinator: Henrik Abramowicz, Ericsson AB 121-pages.
ITU-T Y.1731 Telecommunication Standardization Sector of ITU (Feb. 2008) Series Y: Global Information Infrastructure, Internet Protocol Aspects and Next-Generation Networks Internet protocol aspects—Operation, administration and maintenance OAM functions and mechanisms for Ethernet based networks Recommendation ITU-Y.1731 consisting of 82-pages.
Zhu et al., "UFO: A Resilient Layered Routing Architecture", ACM SIGCOMM Computer Communication Review, vol. 38(5):59-62 Oct. 2008 consisting of 4-pages.
Hedayat et al., Title: "A Two-Way Active Measurement Protocol (TWAMP)" Network Working Group, Request for Comments 5357, Category: Standard Tracks Oct. 2008 consisting of 26-pages.

* cited by examiner

○ = Router/Switch
— = Service connection
······ = Transport network connection

APPARATUS AND METHOD FOR MONITORING OF CONNECTIVITY SERVICES

This application is a Submission Under 35 U.S.C. § 371 for U.S. National Stage Patent Application of International Application Number: PCT/SE2010/050738, filed Jun. 28, 2010 entitled "APPARATUS AND METHOD FOR MONITORING OF CONNECTIVITY SERVICES," the entirety of which is incorporated herein by reference.

TECHNICAL FIELD

The invention relates generally to evaluating the performance of a communication network. The invention relates in particular to an apparatus and method for monitoring and/or measuring of connectivity services in a transport network.

BACKGROUND

Today's evolvement of different types of communication networks is very fast, as well as the different kinds of services that are supported by these different communication networks and thus offered to users of the different communication networks. Often, different types of communication networks are interconnected and used jointly to support various end-to-end services.

A connectivity service provides data communication between two or more entities via a transport network. The transport network itself may rely on e.g. Multi Protocol label Switch Transport Profile (MPIS-TP), Carrier Ethernet and Optical Transport Network (OTN).

In order to ascertain that a transport network is functioning properly and to detect any faults, excessive loads etc., the networks are most often monitored and supervised. This is normally referred to as Operation, Administration and Management (OAM) and this term is also used to describe processes, activities, tools, standards for operating, administrating, managing and maintaining transport networks and connectivity services. Different standards are used for OAM depending on, for example, the technology used for the connectivity services and the transport network.

For Ethernet transport networks, two available standards are ITU-T Y.1731 and IEEE 802.1ag. These standards define fault management and performance monitoring in Ethernet networks. Different parameters may be measured for this purpose, such as frame loss ratio, frame delay and delay variation. Measuring these different parameters assists with Service level Agreement (SIA) assurance and capacity planning. Regarding fault management, the common standards include functionality for continuity checks, loopback measurements, link traces and alarm suppression.

Different connectivity services can have different SIAs, depending on the type of service and the requirements of the customer. Depending on the specific service, different parameters have different importance. Speech, for example, demands very low delay and jitter (delay variation), whereas for data communication delay typically is of less importance and capacity of higher importance. So, different parameters are important to measure for different services.

For IP transport networks, one available standard is RFC 792. This standard defines the Internet Control Message Protocol which is an OAM protocol for IP-based networks. It provides functionality for packet delay, packet round-trip and packet loss measurements. It also has capabilities for tracing the route between hosts in a similar way to the Ethernet link trace function defined in ITU-T Y.1731.

Each network technology defines a set of performance parameters to be measured for OAM purposes. Some examples of such performance parameters again are, delay, delay variation, loss, jitter and capacity for defining SIA performance parameters. Both the parameter definition and naming may vary depending on the standardization body, i.e. the organization in charge of the various standards. Some examples of such organizations are the Metro Ethernet Forum (MEF), International Telecommunication Union (ITU-T), Institute of Electrical & Electronics Engineering (IEEE) and Internet Engineering Task once (IETF). As a consequence, there exist a vast variety of parameters, some being similar in name and definition, but still somewhat different Even one and the same parameter may have different names in different standards.

Different operators also provide different connectivity services. It is not unusual for an operator to provide thousands of different connectivity services, in the future also hundreds of thousands different connectivity services, all having different SIAs. As a result, it becomes very complex indeed to keep track of which parameters are available for each service, and what the acceptable intervals are for each parameter. By an acceptable interval is meant the values a parameter may have to fulfill an SIA for the parameter in question. Further, different tools are used to measure different parameters. Not only does an operator need to keep track of all the various parameters, the operator also needs to know which tool to use for measuring a specific parameter according to different standards. The parameters, the OAM functionality and the measurement tools are technology dependent while the SIA and acceptable intervals are dependent on the specific connectivity service.

SUMMARY

It is an object of the exemplary embodiments of the present invention to address at least some of the problems outlined above. In particular, it is an object of the exemplary embodiments of the present invention to provide monitoring of a connectivity service in a transport network with minimal manual interference from an operator. These objects and others may be obtained by providing an apparatus, a method and a computer program product according to the independent claims attached below.

According to one aspect, an apparatus is provided which is configured to monitor a connectivity service in a transport network. The apparatus comprises an obtaining unit, adapted to request and obtain, for the connectivity service, a Service Definition and Measurement Point, MP. The Service Definition comprises a set of measurable parameters. The obtaining unit is further adapted to request and obtain a mapping of each of the measurable parameter(s) to Operation Administration and Maintenance function(s), OAM function(s), of the connectivity service. The obtaining unit is further adapted to request and obtain a mapping of the measurable parameter(s) and OAM-function(s) to which tool(s) to use for measuring the measurable parameter(s) of the connectivity service. The apparatus further comprises a measuring unit, adapted to perform measurement of the measurable parameter(s) between the Measurement Point using the tool(s).

In an embodiment, the apparatus further comprises a filtering unit adapted to filter the result(s) of the measurement(s) of the measurable parameter(s).

In an embodiment, the apparatus further comprises an interface adapted to receive a request to monitor the connectivity service and to output a report of the performed measurement(s).

In an embodiment, the Service Definition comprises defined intervals for the measurable parameters.

According to an embodiment, the obtaining unit is further adapted to select a parameter within the set of measurable parameters to measure, and wherein the measuring unit is further adapted to measure the selected parameter between the Measurement Point using the tool.

According to another aspect, a method is defined, for monitoring a connectivity service in a transport network. The method comprises requesting and obtaining a Service Definition and Measurement Points, MPs, for the connectivity service to be monitored, the Service Definition comprising a set of measurable parameters. The method further comprises requesting and obtaining a mapping of each of the measurable parameter(s) to Operation Administration and Maintenance function(s), OAM-function(s), of the connectivity service. Further, the method comprises requesting and obtaining a mapping of the measurable parameter(s) and OAM-function(s) to which tool(s) to use for measuring the measurable parameter(s) of the connectivity service. The method also comprises measuring the parameter(s) between the Measurement Points using the tool(s).

According to yet another aspect, a computer program product is defined, which when run in one or more processing units, causes the apparatus to perform the method.

According to an embodiment of the method, the method further comprises filtering the result(s) of the measurement(s).

In an embodiment of the method, the method comprises receiving a request to monitor the connectivity service and a report of the performed measurement(s) is provided in response to receiving the request to monitor the connectivity service.

In an embodiment of the method, the monitoring of the connectivity service comprises measuring the measurable parameter(s) between the Measurement Points using the tool(s) and to compare the measured parameter(s) to defined interval(s) comprised in the Service Definition.

In an embodiment of the method, the method further comprises selecting a parameter within the set of measurable parameters to measure and measuring the selected parameter between the Measurement Points using the tool.

The apparatus and method have several advantages. Firstly, it allows a user, such as an operator of the transport network, to merely choose which service is to be monitored and/or measured without having to find out and specify which parameters should be measured for the specific connectivity service given the specific transport network. The operator does not have to specify which tool(s) to use for such a measurement The operator does neither need to know between which measurement points the measurement should be performed. This in turn results in operational cost savings due to simplified management procedures.

The operator does not even need to know whether the service is an Ethernet, IP or any other service.

The operator does not have to know the exact tools to use for performing the measurements. As a consequence, new tools can be inserted in the system centrally, by updating appropriate databases, without training the operators.

By filtering the measurement data results, the data needed to be transferred to the operator is condensed. This provides reduced complexity for the operator as he/she performs his/her manual analysis of the results from the measurements.

BRIEF DESCRIPTION OF DRAWINGS

The invention will now be described in more detail by means of exemplary embodiments and with reference to the accompanying drawings, in which.

DETAILED DESCRIPTION

Figure 1:
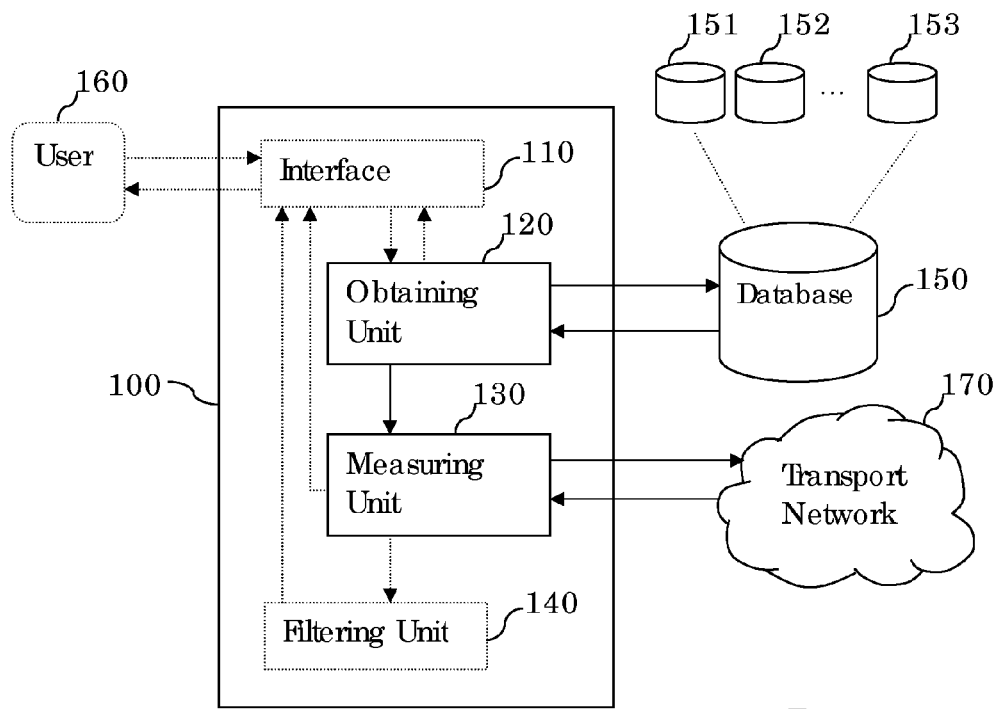
FIG. 1 is a block diagram of an embodiment of an apparatus for monitoring of a connectivity service in a transport network.

Briefly described, an apparatus, a method and a computer program product are provided for monitoring of a connectivity service in a transport network. The monitoring is performed, among other reasons, to ascertain that the connectivity service complies with the Service Level Agreements, SIA(s), for that connectivity service.

An exemplary embodiment of such an apparatus will now be described with reference to the block diagram in FIG. 1. In this example, the apparatus 100 comprises an obtaining unit 120 adapted to request and obtain a Service Definition and Measurement Points, MPs, for the connectivity service. The Service Definition comprises a set of measurable parameters which are associated with the connectivity service. The obtaining unit 120 is further adapted to request and obtain a mapping of measureable parameter(s) to OAM function(s) of the connectivity service. The obtaining unit 120 is further adapted to request and obtain a mapping of the measurable parameter(s) and function(s) to which tool(s) to use for measuring the parameter(s) of the connectivity service between the MR.

The apparatus 100 further comprises a measuring unit 130 adapted to perform measurement of the parameter(s) between the MPs using the tool(s).

This exemplary embodiment of the apparatus has several advantages. Firstly, it allows a user, such as an operator of the transport network, to merely choose which service is to be monitored and/or measured without having to find out and specify which parameters should be measured for the specific connectivity service given the specific transport network. The operator does not have to specify which tool(s) to use to such a measurement The operator does neither need to know between which measurement points the measurement should be performed.

The Service Definition for a connectivity service comprises a set of measurable parameters associated with the connectivity service. This implies that there is at least one measurable parameter in the Service Definition. There might also be a plurality of parameters. In case the Service Definition comprises a plurality of measurable parameters, a corresponding plurality of tools may be required to measure all of the plurality of measurable parameters. Of course, it might also be possible to use one tool for more than one measurable parameter. The measurable parameters are performance parameters associated with the SIA for the connectivity service in question As an example, to monitor a specific connectivity service, the obtaining unit 120 will request and obtain a Service Definition for the specific connectivity service as well as the Measurement Point. Assume that for this specific connectivity service the parameter comprised in the Service Definition, i.e. the parameter to measure, is e.g. RTT (Round Trip Time). The obtaining unit 120 then requests and obtains a mapping of the parameter to a function. The function can also be seen as a protocol, for example an IP service could utilize ICMP (Internet Control Message Protocol) and an Ethernet service could e.g. utilize Y.1731 OAM. Thereafter, the obtaining unit requests and obtains which tool to use to measure delay by measuring the parameter le the transport network is an IP network, then the is measured using the tool "ping" in this example.

The Measurement Point, MPs, are located within the transport network.

There are typically at least two MPs between which the measurement is to be performed. They are located in the transport network in a distributed manner. The MPs can be on the ingress node and on the egress node defining a service. A node can be, e.g., a router or a switch within the transport network. There may be more than two MPs. As an example, in a transport network, several nodes may be involved for supporting the service through the transport network from the ingress node to the egress node. All the involved nodes constitute a service path or a service connection. All the involved nodes in the service path can constitute a Measurement Point. It may be advantageous to have more than two MPs when monitoring a connectivity service. In case the measurement of the parameters indicates that the SIA for a monitored connectivity service is not fulfilled, having several MPs can indicate where in the transport network the problem is. The MPs are capable of receiving instructions for measurements and they are also able to perform active measurements to another Measurement Point. They are also capable of receiving measurement packet and to report measurement result. A measurement packet is a packet carrying data relevant to a certain type of measurement to be performed. For example, for a packet loss measurement, the packet might carry a sequence number. For a delay measurement, it might carry a time stamp corresponding to the time of sending.

According to an embodiment, the apparatus 100 further comprises a filtering unit 140, adapted to filter the result of the measurement of the parameter(s).

In one example, the filtering unit 140 is adapted to filter out results from measurements which are within the defined acceptable interval for that parameter or those parameters. Then these results may for example merely be reported back as "OK". Only results from measurements which are outside the acceptable interval for that parameter or those parameters are reported back with the exact results of the measurements.

Further, the filtering unit 140 can be adapted to perform correlation and filtering of the result(s). In case results from measurements of many different connectivity services report violations of one parameter, the filtering unit may correlate data between measurement points that belong to these connectivity services and present a simplified view to the operator. Depending on the underlying problem giving rise to the frequent violation of this parameter, the filtering unit 140 might provide the root cause of the problem by identifying a network segment or device which is causing the problem.

In alternative embodiments, not shown here, the filtering unit 140 may be implemented in a distributed manner or as a part of another apparatus, node or the like so as to not form part of the apparatus 100 but networking with the same.

One advantage thereof is that only results from measurements which are outside an acceptable interval are specified with the value for that or those parameters. This makes it easier for an operator or user since it is clear if he/she needs to take any action due to a result of a monitoring/measurement in which the measured parameters are outside a corresponding acceptable interval. A result stating "OK" informs the user or operator that the SIAs are fulfilled for that specific connectivity service, also indicating that the operator doesn't need to take any action.

In one example, the apparatus 100 comprise an interface 110 adapted to receive a request to monitor the connectivity service and to output a report of the performed measurement(s) in response to the received request to monitor the connectivity service.

The Interface can be a user interface, a machine-to-machine interface or any other appropriate interface. The interface 100 enables a user 160 of the apparatus 100 to easily make use of the apparatus 100 to monitor the connectivity services supported by the transport network.

The Service Definition also comprises defined intervals for the parameters.

As described earlier, different services have different SIAs. Depending on the service in question, different characteristics or measurable performance parameters are important. To ascertain that an SIA for a specific connectivity service is fulfilled, the measured parameters are compared to the respective defined interval(s). Defined interval or acceptable interval means the interval or range of values for which a certain parameter fulfills an SIA for that certain parameter for a certain connectivity service. As an example, if a parameter to measure is delay, and the service is speech related, the delay typically must be very small. As an example, the delay must not be more than 100 ms. Then, the acceptable interval or the defined interval for the parameter is 0-100 ms. As long as a measured parameter is within the defined acceptable interval, the SIA is fulfilled for that parameter. Of course, in order to fulfill an SIA, a plurality of parameters may need to be within a respective defined acceptable interval for each parameter.

In one example of the apparatus 100, the obtaining unit 120 is further adapted to select a parameter within the set of measurable parameters to measure. The measuring unit 130 is further adapted to measure the selected parameter between the Measurement Points using the tool.

It may be the case that a plurality of parameters is associated with a specific connectivity service. A user or operator may be interested in only one of these. In such a case, it is not necessary to perform measurements for all the parameters which would, in addition, be a waste of resources. It might possibly also force the user or operator to having to evaluate all the returned results or at least to go through the results of all measured parameters on order to find the specific parameter of interest By this example, the user or operator will only get the result from the measurement of the parameter of interest reported back to him/her.

According to one embodiment of the apparatus 100, the obtaining unit 120 is adapted to request and obtain the Service Definition and Measurement Points from a Service Database 150, 151, 152, 153.

The service database 150, 151, 152, 153 in FIG. 1 may be one database or several databases. They may be implemented in a distributed manner or centralized. The Service Database contains information about the supported connectivity services in the transport network, herein referred to as Service Definition. Each connectivity service is also associated with a set of Measurement Points. As a new service is provisioned, the Service Definition and associated Measurement Points are entered into the Service Database.

Further, the obtaining unit 120 is adapted to request and obtain the mapping of measurable parameter(s) to function(s), from a Function Database 150, 151, 152, 153.

Still further, the obtaining unit 120 is adapted to request and obtain the mapping of parameter(s) and function(s) to tool(s) to use for measuring, from a Tool Database 150, 151, 152, 153.

The database 150 in FIG. 1 may be just one single database, but it may also be several databases 151, 152 and 153. As an example, the Service Database, the Function database and the Tool Database may be incorporated into one database, or be separate databases. Alternatively two of the above databases may be incorporated into one database and the third may be a separate database. According to one example, which will be described later, the Function Database and the Tool Database can be advantageously combined into one Database.

The apparatus 100 can for example be a Self-Organizing-Network module, SON-module, or a proxy. Self Organizing Networks are a part the 3GPP Long Term Evolution (LTE).

The apparatus 100 acts as a proxy between the operator and an SIA verification functionality. The apparatus 100 can be said to "drive" the SIA verification functionality. As has been explained earlier, the apparatus 100 retrieves the necessary information for performing the monitoring and measuring, and also performs the monitoring and measuring itself In one example, a service called "connectivity E-LINE" is to be monitored. The E-LINE service uses point-to-point Ethernet Virtual Connections, EVCs. An EVC is an association between one or more User Network Interfaces, UNIs, for exchanging an Ethernet frame among the associated entities. An EVC can refer to a point-to-point or multipoint-to-multipoint connectivity.

For this service, there are several parameters available. The parameters are: UNI Identifier, Physical Medium, Speed, Mode, MAC (Medium Access Control) layer, UNI MTU (Maximum Transfer/Transmission Unit) Size, Service Multiplexing, CE-VLAN (Carrier Ethernet Virtual Local Area Network) ID (Identification) for untagged and priority tagged Service flames, Maximum number of EVCs, Ingress Bandwidth Profile, Egress Bandwidth Profile, Layer 2 Control Protocols Processing, Frame Delay, Frame Delay Variation and Frame Loss Variation. That is 15 different parameters. Further, the Ingress Bandwidth Profile includes Committed Information Rate, Committed Burst Rate, Excess Burst Rate and Excess Information Rate. The combination of the parameters in the Ingress bandwidth Profile defines the Bandwidth that is specified in the SIA for this service.

This illustrates that many parameters may be available for each and every connectivity service, which makes it difficult for the operator to first find out for a specific connectivity service which parameters are available. Then to choose which parameters to measure. After that the operator needs to determine which tools to use for measuring the chosen parameters.

Assume in this example that the parameters to measure are Frame Delay, bandwidth and Frame Loss. Then the tools to use could be for Frame Delay: Y.1731, for Bandwidth BART (Bandwidth Available in Real Time) and/or pathchar, and for flame loss: Y.1731. For clarity it shall be noted that the Y.1731 is an ITU recommendation for OAM functions and mechanisms for Ethernet based networks, and that pathchar is a tool to infer characteristics of Internet paths.

By employing the apparatus 100 described above, the apparatus will determine which parameters are available and subsequently determine which tools to use for the measurement of these parameters. In more detail, the operator requests monitoring of the connectivity service E-LINE. The obtaining unit 120 of the apparatus 100 requests and obtains a Service Definition and Measurement Point for the service E-LINE. The service Definition comprises a set of measurable parameters. In this example, all the 15 parameters specified above could be used. The Service Definition could, as a consequence, comprise all these 15 parameters. However, in the Service Definition, the set of parameters to measure are Frame Delay, Bandwidth and Frame Loss.

Then, the obtaining unit 120 requests and obtains a mapping of these parameters to functions and subsequently a mapping of parameters and functions to which tools to use to measure the parameters comprised in the Service Definition. The obtaining unit 120 will obtain the tools: Y.1731 for Frame Delay, BART and/or pathchar for Bandwidth, and Y.1731 for Frame Loss.

The measuring unit 130 will then proceed to measure Flame Delay, Bandwidth and Frame Loss between the MPs in the transport network using the tools Y.1731, BART and pathchar.

Figure 2:
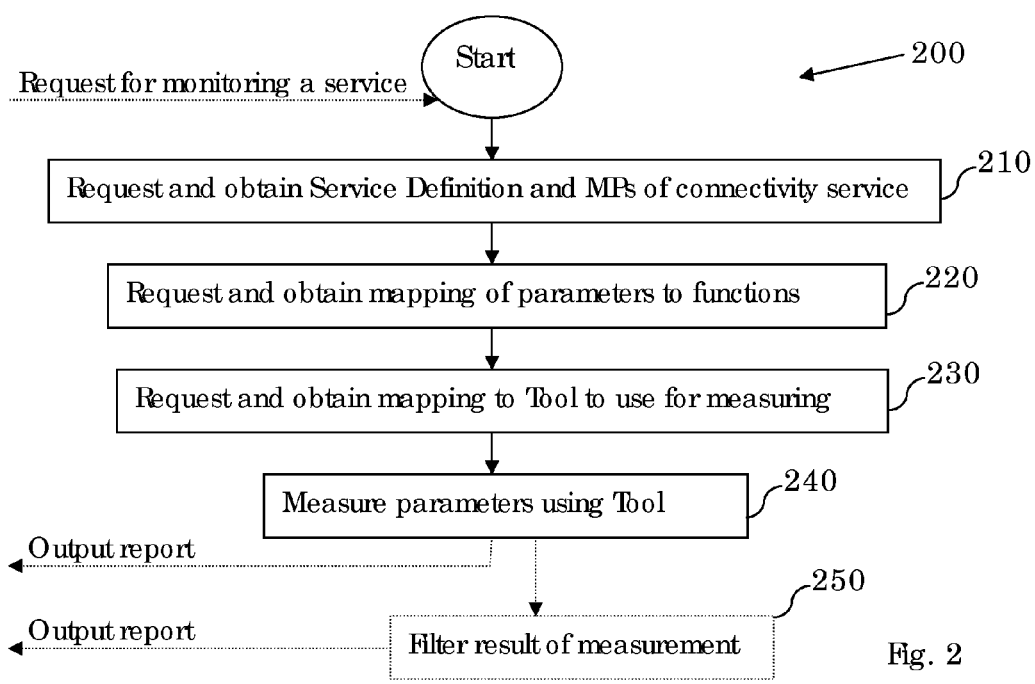
FIG. 2 is a flowchart of an embodiment of a procedure for monitoring of a connectivity service in a transport network.

FIG. 2 is a flowchart of an embodiment of a procedure 200 for monitoring of a connectivity service in a transport network. The procedure illustrated in FIG. 2 comprises similar or the same characteristics and advantages as the previously described apparatus and these characteristics and advantages will not be repeated for simplicity reasons.

FIG. 2 illustrates the procedure 200 first requesting and obtaining 210 a Service Definition and Measurement Point, MPs, for a specific connectivity service to be monitored, the Service Definition comprising a set of measurable parameters. The procedure 200 also comprises requesting and obtaining 220 a mapping of each of the measurable parameter(s) to OAM-function(s) of the connectivity service. Further, a mapping of the measurable parameter(s) and OAM-function(s) to which tool(s) to use for measuring the measurable parameter(s) of the connectivity service is requested and obtained 230. Then, the parameter(s) are measured 240 between the Measurement Point using the tool(s).

According to an embodiment, the procedure further comprising filtering 250 the result(s) of the measurement(s).

According to an embodiment of the procedure, the procedure comprises receiving a request to monitor a connectivity service and subsequently output a report of the performed measurements in response to the received request to monitor the connectivity service.

In an embodiment of the procedure, the monitoring of the connectivity service comprises measuring 240 the measurable parameter(s) between the Measurement Points using the tool(s) and comparing the measured parameter(s) to defined intervals comprised in the Service Definition.

As stated before, the Service Definition can also comprise one or more defined intervals for the measurable parameter(s) associated with a specific connectivity service. In such a case, the measured parameter(s) are compared to the defined interval(s) to ascertain that the SIA for that specific connectivity service is fulfilled, corresponding to the measured parameter(s) being within the defined interval.

In an example, the procedure comprises selecting a parameter within the set of measurable parameters to measure and then measuring that selected measurable parameter between the Measurement Points using the tool.

The selecting of a parameter to measure can be done in any of the steps 220-240.

In an embodiment, the requesting and obtaining 210 a Service Definition and Measurement Points, MPs, for the connectivity service to be monitored, are performed towards a Service Database.

Further, the requesting and obtaining 220 a mapping of each of the measurable parameter(s) to OAM-function(s), are performed towards a Function Database.

Still further, the requesting and obtaining a mapping of the measurable parameter(s) and OAM-function(s) to which tool(s) to use for measuring the measurable parameter(s), are performed towards a Tool Database, according to one embodiment of the procedure.

Figure 3:
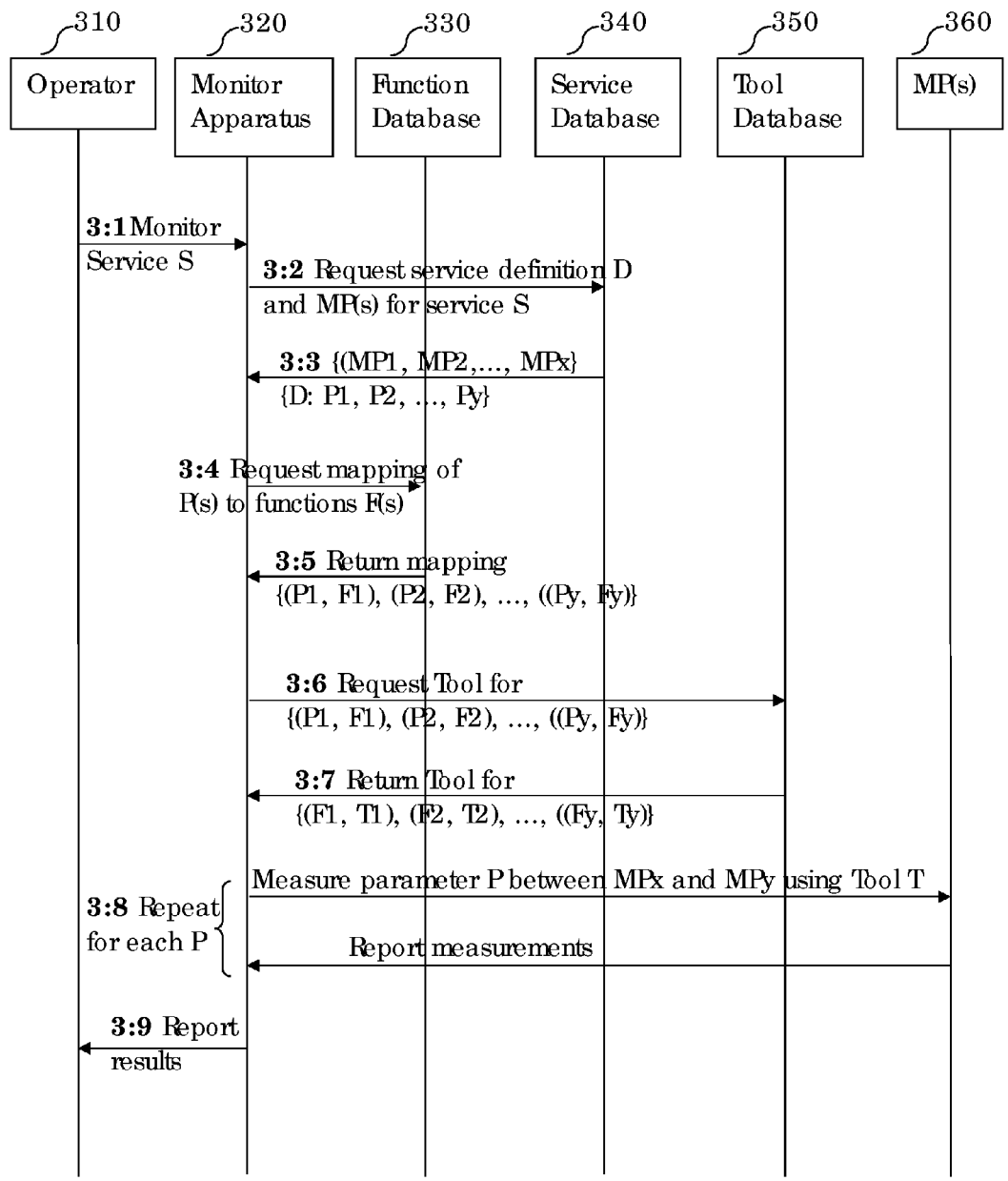
FIG. 3 is a signaling diagram of an embodiment of a procedure for monitoring of a connectivity service in a transport network.

FIG. 3 is a signaling diagram of an exemplary embodiment of a procedure for monitoring of a connectivity service in a transport network.

FIG. 3 illustrates an operator 310 wishing to monitor a connectivity service. This connectivity service is denoted S in the figure. The operator 310 requests 3:1 from the apparatus 320, which apparatus 320 corresponds to the apparatus 100 having been described in relation to FIG. 1. For clarity reasons it shall be noted that the apparatus may be a proxy or other kind of apparatus or arrangement The Monitor Apparatus 320 firstly requests 3:2 the Service Definition and Measurement Points for the service S from a Service Database 340. The Service Database 340 returns 3:3 the requested Service Definition, D, and Measurement Point, (MP1, Mp2, . . . , MPx) to the Monitor Apparatus 320. The Service Definition, D, comprises a set of measurable performance parameters (P1, P2, . . . , Py).

After obtaining the Service Definition and Measurement Point, the Monitor Apparatus 320 requests 3:4 a mapping of the measurable parameters, P(s), to function(s), F(s), from a Function Database 330. The Function Database 330 returns 3:5 a mapping of parameters to functions, {(P1, F1, (P2, F2, . . . , (Py, Fy)}. The function can also be seen as protocols, for example an IP service could utilize ICMP and an Ethernet service could utilize Y.1731 OAM.

After obtaining a mapping of the parameters to functions, the Monitor Apparatus 320 requests 3:6 a mapping of the parameters and functions to which tool(s) to use for measuring the measurable parameters between the Measurement Point. The request is made to a Tool Database 350. The Tool Database returns 3:7 information on which tool(s) to use for measuring the parameters. Note that in this example, a plurality of parameters is defined or exists in the Service Definition D for the service S. More precisely, there are y number of parameters and further there are x number of Measurement Points. As the Monitor Apparatus 320 receives a mapping of the y number of parameters and functions to tools to use for measuring the parameters, the Monitor Apparatus receives y number of tools corresponding to the y number of parameters. For clarity reasons, one tool may be used to measure more than one parameter. Therefore, the number of tools may be less than the number of measurable parameters. However, in this example, there are y number of parameters and y number of tools.

After having received 3:7 information on which tools to use for measuring the parameters, the Monitor Apparatus 320 starts measuring 3:8 each of the y numbers of parameters between all of the x number of Measurement Points 360.

As all the measurements of all the measurable parameters are completed, the Monitor Apparatus 320 reports 3:9 the results of the measurements back to the Operator 310.

Figure 4:
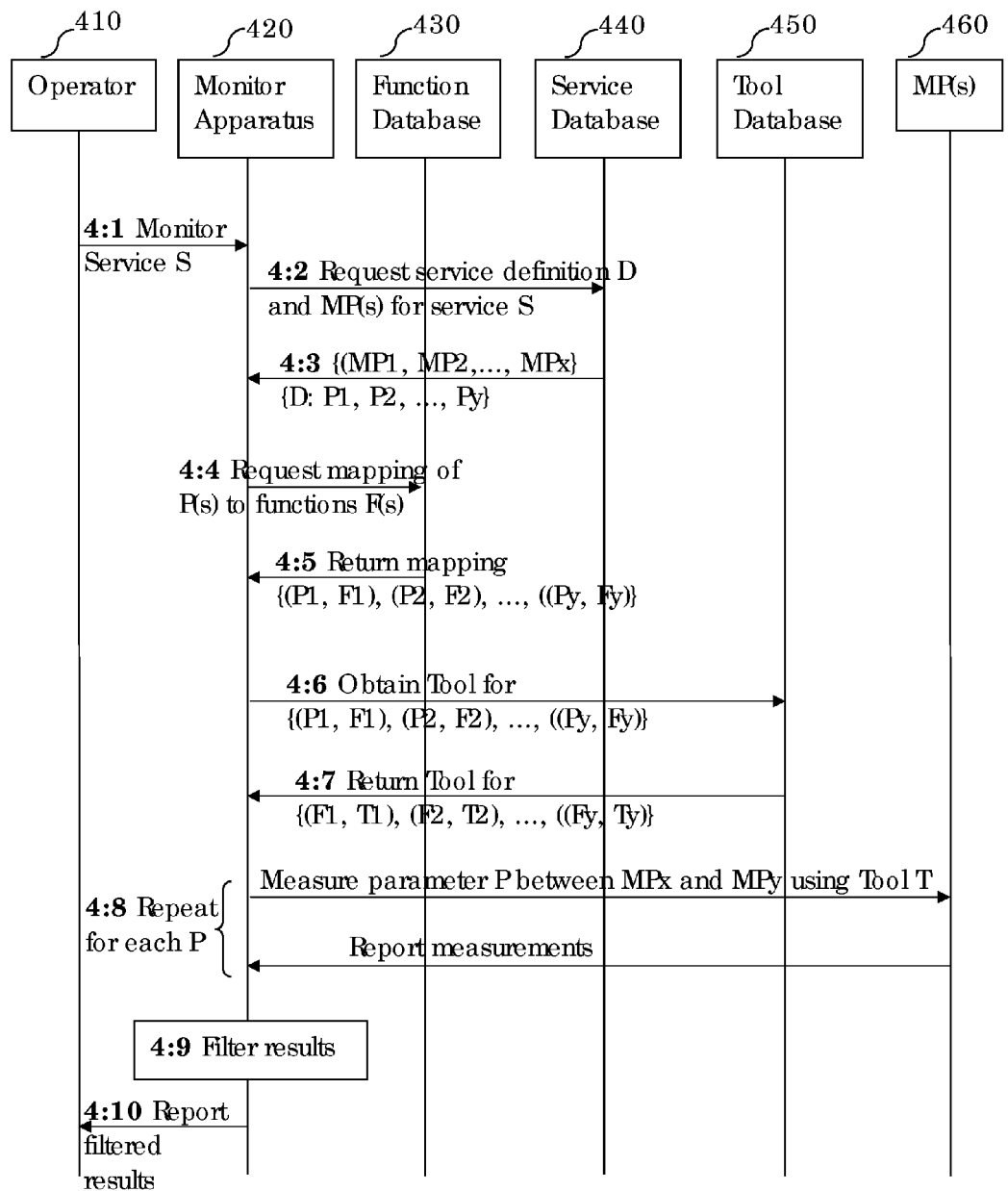
FIG. 4 is a signaling diagram of another embodiment of a procedure for monitoring of a connectivity service in a transport network.

FIG. 4 is a signaling diagram of another exemplary embodiment of a procedure for monitoring of a connectivity service in a transport network. This embodiment is similar to the one described above in relation to FIG. 3. The "entities" 410460 in FIG. 4 correspond to the "entities" 310-360 in FIG. 3. likewise, "steps" or "actions" 4:1-4:8 in FIG. 4 correspond to "steps" or "actions" 3:1-3:8 in FIG. 3.

In FIG. 4, after the Monitor Apparatus 420 has performed all the measurements, 4:8, the Monitor Apparatus filters 4:9 the result of the measurements. After the filtering 4:9 is complete, the filtered results are reported back 4:10 to the operator 410.

The filtering can be performed in various ways. Just as an example, only parameters which have been found to be outside the defined acceptable interval for the parameters in question are reported back to the operator 410. Alternatively, all measured parameters are reported back, however, the ones being within its defined acceptable interval are reported back as "OK", whereas the parameters being outside their respective defined acceptable interval are reported back with the specific measured value of that or those parameters.

Figure 5:
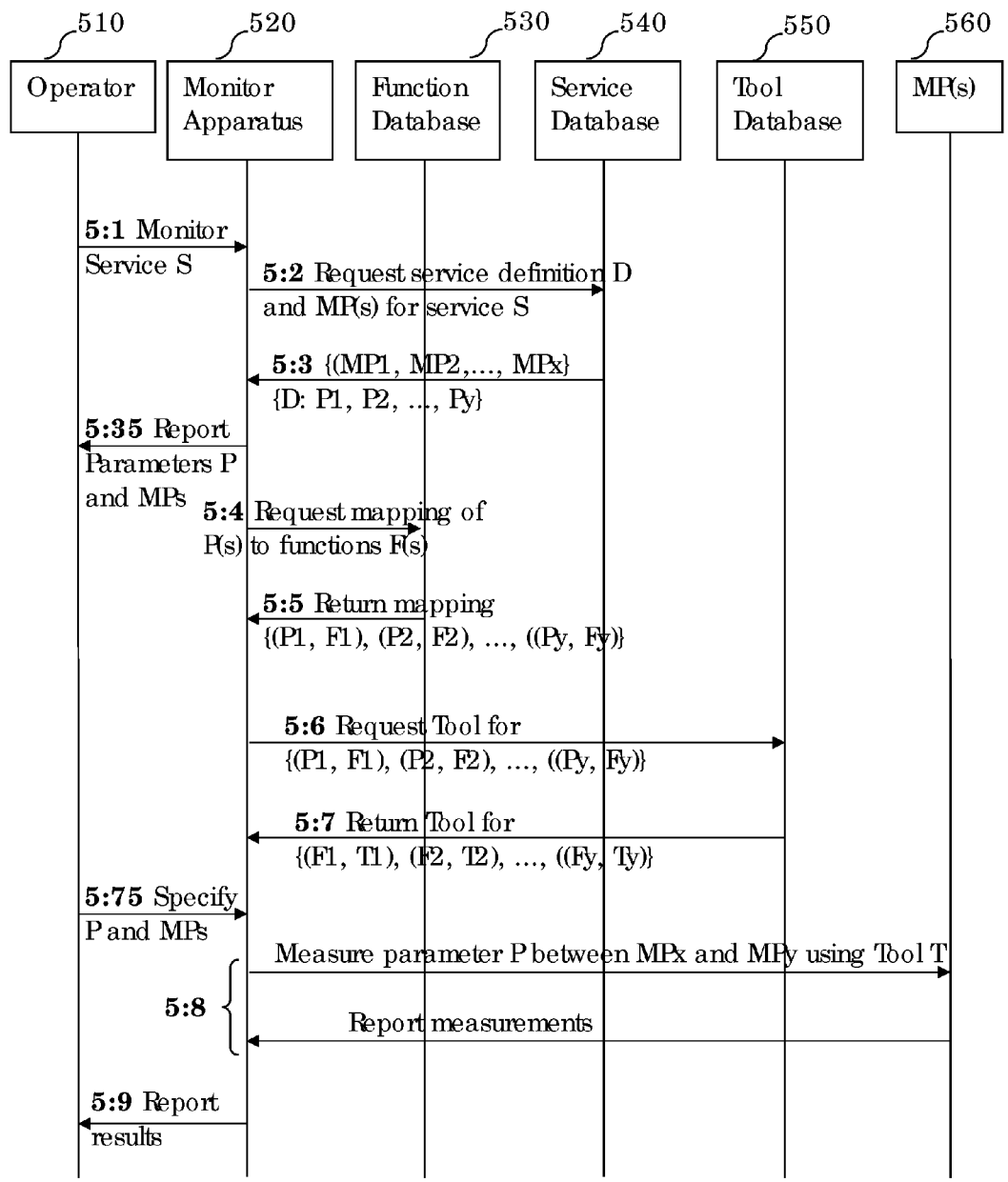
FIG. 5 is a signaling diagram of yet an exemplary embodiment of a procedure for monitoring of a connectivity service in a transport network.

FIG. 5 is a signaling diagram of yet an exemplary embodiment of a procedure for monitoring of a connectivity service in a transport network. The "entities" 510-560 in FIG. 5 correspond to the "entities" 310-360 in FIG. 3 and the "entities" 410-460 in FIG. 4. likewise, "steps" or "actions" 5:1-5:7 in FIG. 5 correspond to "steps" or "actions" 3:1-3:7 in FIG. 3 and "steps" or "actions" 4:1-4:7 in FIG. 4.

In the example illustrated in FIG. 5, the Monitor Apparatus 520 reports 5:35 the measurable parameters and the Measurement Points to the operator 510 after having obtained these in a previous step 5:3. Then the Monitor Apparatus 520 continues as previously described in relation to FIGS. 3 and 4 to request and obtain a mapping of the measurable parameters to functions and further a mapping of parameters and functions to which tools to use for measuring the measurable parameters P This is done in steps 5:4-5:7 in the same manner as previously described in relation to FIGS. 3 and 4.

The operator 510 selects 5:75 a specific measurable parameter of interest, which the operator wants to measure and the operator also selects the Measurement Points 560 between which the parameters are to be measured. As the Monitor Apparatus 520 receives 5:75 this selection from the operator 510, the Monitor Apparatus 520 proceeds to measure 5:8 the selected parameter between the selected MIS 560.

When the measurement is completed, the Monitor Apparatus 520 reports 5:9 the result of the measurement back to the operator 510.

Although not illustrated in the example in FIG. 5, the result could be filtered before being reported back to the operator 510. As only one parameter is measured, filtering might not be necessary, but it could simplify the evaluation of the result by returning "OK" if the measurement shows that the parameter is within the defined acceptable interval for that parameter.

According to another example, not illustrated in FIG. 5, the operator 510 could choose more than just one parameter to measure. Suppose the Service Definition returns ten measurable parameters for a service S. Then the operator might be interested in e.g. only two or three of these measurable parameters. If the operator selects three parameters, then step 5:8 will be repeated for each of the selected three parameters in the same manner as is described in the corresponding step 3.8 in FIG. 3 and step 4:8 in FIG. 4.

Figure 6:
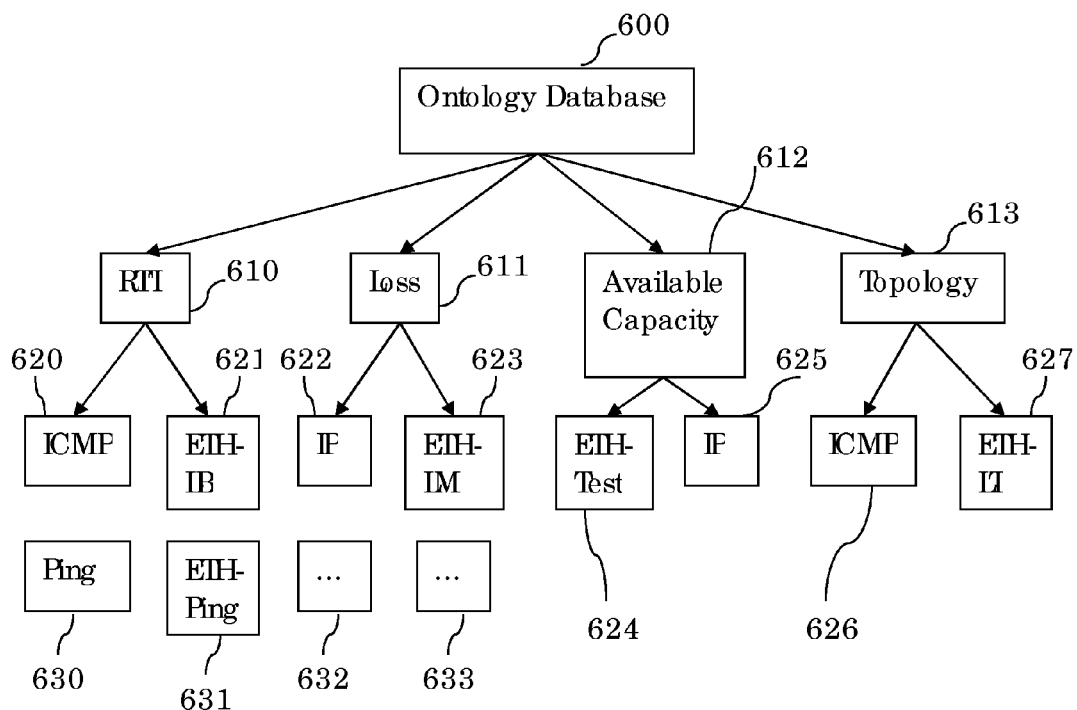
FIG. 6 is diagram of an illustrative example of a combined Function Database and Tool Database, called Ontology Database.

Turning now to FIG. 6, which is diagram of an illustrative example of a combined Function Database and Tool Database. The combined Function and Tool Database 600 in FIG. 6 corresponds to a combination of Function Database and Tool Database 330+350, 430+450 and 530+550 in FIGS. 3, 4 and 5 respectively. The combined Function and Tool Database is called "Ontology Database".

The Ontology Database 600 comprises mappings between technology-agnostic measurable performance parameters 610-613 into technology-specific definitions and OAM functionality 620-627 to be used for measuring the parameters. The Ontology Database provides a mapping to the actual measurement tool 630-633 to be used for each of the measurable parameters. For example, the Round Trip Time 610, RTT, performance parameter, i.e. the measurable parameter, is mapped into ICMP (Internet Control Message Protocol) 620 for IP-based networks and ETH-LB (Ethernet Loop-Back) 621 for Ethernet based networks. Further, for IP-based networks, the "ping" tool 630 could be used, while "eth-ping" 631 is used for Ethernet-based networks.

The Ontology Database is updated when a new service is implemented in the transport network so that the apparatus 100 for monitoring a connectivity service can access the Ontology Database and request and obtain the necessary information as described above.

Figure 7:
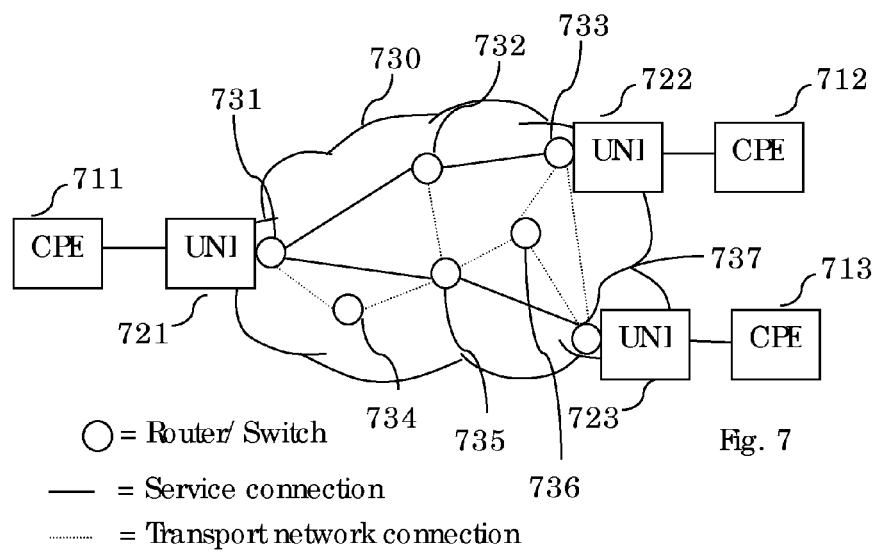
FIG. 7 is a schematic illustration of a metro network having two connectivity services connecting two different User Network Interfaces over a transport network.

FIG. 7 is a schematic illustration of a metro network having two connectivity services providing data communication between two different User Network Interfaces, UNIs, over a transport network.

In this example, three entities, nodes or sites 711, 712 and 713 are connected using a connectivity service. The three entities or nodes are CPEs (Customer-Premises Equipments) All three each employ and communicate through a respective User Network Interface, UNI, 721, 722 and 723 respectively. They are using a transport network 730 for the service, which network comprises routers and/or switches 731-737. The transport network can be e.g. a Carrier Ethernet or MPLS-TP network (Multi Protocol Label Switch Transport Profile). In this example, all the routers/switches 731-737 can be a measurement point. There are two Service Paths or Service Connections, namely 731+732+733 and 731+735+737.

The procedure can be employed to this example. Likewise, the apparatus can be implemented in this example in a centralized or distributed manner. If an operator wishes to monitor the service currently employed by the three CPEs 711, 712 and 713, suitable MPs are of course the ingress and egress routers/switches 731+733 and 731+737 respectively. Of course any router and/or switch in the service path are suitable MPs in this example.

Figure 8:
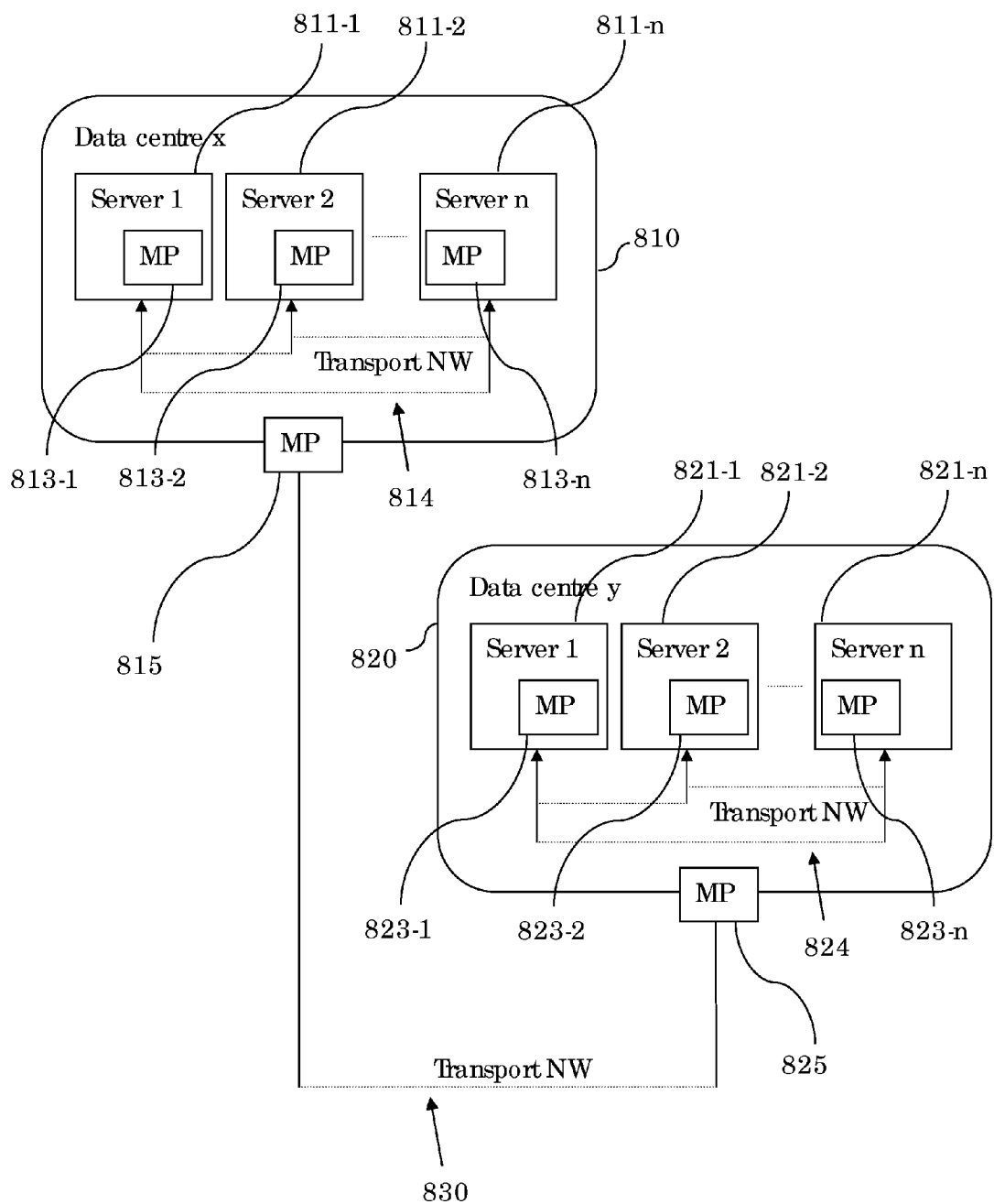
FIG. 8 is a schematic illustration of two data centers interconnected via a connectivity service over a transport network. The sewers in each data centre are also interconnected via connectivity services over internal transport networks.

FIG. 8 is a schematic illustration of two data centers interconnected via a connectivity service over a transport network. The sewers in each data centre are also interconnected via connectivity services over internal transport networks FIG. 8 illustrates two similar data centers 810 and 820. Each data center comprises n number of Servers, 811-1 to 811-n and 821-1 to 821-n respectively. Each Server comprises a measurement point 813-1 to 813n and 823-1 to 823-n respectively. Further, each data center has its Servers internally connected or communicating via a transport network 814 and 824 respectively. The two data centers 810 and 820 are interconnected or communicating data via another transportnetwork 830. At their respective connection point to the transportnetwork 830, they both have a respective Measurement Point 815 and 825.

The procedure can be employed also to this example. likewise, the apparatus can be implemented in this example in a centralized or distributed manner. Each data center 810 and 820 can employ the procedure or implement the procedure independently of each other. Also the procedure can be employed by and/or the apparatus can be implemented in the transport network 830 between the two data centers 810 and 820.

Figure 9:
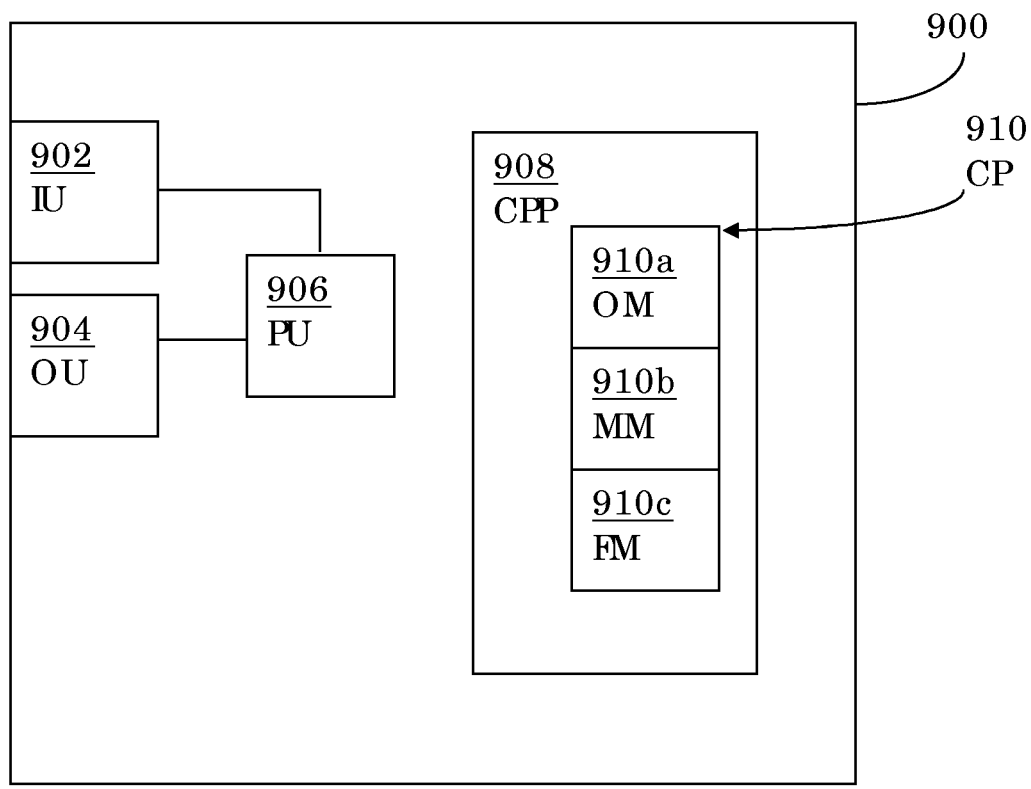
FIG. 9 is a schematic view illustrating an arrangement, according to an embodiment

FIG. 9 schematically shows an embodiment of an arrangement 900 in an apparatus for monitoring of a connectivity service, which also can be an alternative way of disclosing an embodiment of the arrangement in an apparatus for monitoring of a connectivity service illustrated in FIG. 1. Comprised in the arrangement 900 are here a processing unit, PU, 906, e.g. with a DSP (Digital Signal Processor). The processing unit 906 can be a single unit or a plurality of units to perform different steps of procedures described herein. The arrangement 900 also comprises an input unit, IU, 902 for receiving signals, such as e.g. result from mappings, measurements performed between Measurement Point, and an output unit, OU, 904 for output signal(s), such as e.g., request for mappings, measurements and results of measurements. The input unit 902 and the output unit 904 may be arranged as one in hardware of the arrangement Furthermore the arrangement 900 comprises at least one computer program product CPP, 908 in the form of a non-volatile memory, e.g. an EEPROM (Electrically Erasable Programmable Read-Only Memory), a flash memory and a disk drive. The computer program product 908 comprises a computer program, CP, 910, which comprises code means, which when run in the processing unit 906 in the arrangement 900 causes the arrangement and/or the apparatus for monitoring of a connectivity service to perform the steps of the procedure described earlier in conjunction with FIG. 2.

Hence in the exemplary embodiments described, the code means in the computer program 910 of the arrangement 900 comprises an obtaining module, OM, 910a for requesting and obtaining, for a specific connectivity service, a Service Definition and Measurement Points, the Service Definition comprising a set of measurable parameters. The obtaining module 910a is further arranged to request and obtain a mapping of each of the measurable parameter(s) to OAM-function(s) and to request and obtain a mapping of the measurable parameter(s) and OAM-function(s) to which tool(s) to use for measuring the measurable parameter(s) of the connectivity service.

The computer program may further comprise a measuring module, MM, 910b for measuring the measurable parameters between the Measurement Points using the tool(s).

The computer program may further comprise a filtering module, FM, 910c for filtering the result of the measurement of the measurable parameter(s) between the Measurement Points.

The computer program 910 is in the form of computer program code structured in computer program modules. The modules 910a-c essentially perform the steps of the flows illustrated in FIG. 2 to emulate the apparatus for monitoring of a connectivity service illustrated in FIG. 1. In other words, when the different modules 810a-c are run on the processing unit 906, they correspond to the units 120-140 of FIG. 1.

Although the code means in the embodiment disclosed above in conjunction with FIG. 9 are implemented as computer program modules which when run on the processing unit causes the arrangement and/or apparatus for monitoring of a connectivity service to perform the steps described above in the conjunction with figures mentioned above, at least one of the code means may in alternative embodiments be implemented at least partly as hardware circuits.

Many different protocols may be employed for initiating, performing and collecting data from measurements. One example of such a protocol is the IETF protocol TW AMP (Two-Way Active Measurement Protocol).

It should be noted that FIG. 1 merely illustrates various functional unit in the apparatus in a logical sense. However, the skilled person is free to implement these functions in practice using any suitable software and hardware means. Thus, the invention is generally not limited to the shown structures of the apparatus and the functional unit. Further the apparatus can be implemented in a distributed manner or centralized.

While the invention has been described with reference to specific exemplary embodiments, the description is generally only intended to illustrate the inventive concept and should not be taken as limiting the scope of the invention. The present invention is defined by the appended claims.

The invention claimed is:

1. An apparatus (100) configured to monitor a connectivity service in a plurality of transport network types, the apparatus (100) comprising:
    an obtaining unit (120) configured to:
        request and obtain, with regard to a type of the transport network, for said connectivity service, a Service Definition and Measurement Points, MPs, said Service Definition comprising a set of measurable parameters;
        request and obtain a mapping of each of said measurable parameters to Operation Administration and Maintenance functions, OAM-functions, of the connectivity service, the OAM-functions corresponding to a protocol which is dependent on the transport network type;
        request and obtain a mapping of said measurable parameters and OAM-functions as to which at least one tool to use for measuring said measurable parameters of said connectivity service;
        request and obtain said Service Definition and Measurement Points from a Service Database (150, 151, 152, 153); and
        request and obtain said mapping of measurable parameters to functions from a Function Database (150, 151, 152, 153);
    said apparatus (100) being configured to request and obtain said mapping of parameters and functions to the at least one tool to use for measuring from a Tool Database (150, 151, 152, 153); and
    a measuring unit (130) configured to perform measurement of said measurable parameters between said Measurement Points using said at least one tool.

2. The apparatus (100) according to claim 1, further comprising a filtering unit (140), the filtering unit (140) configured to filter the result of said measurement of said measurable parameters.

3. The apparatus (100) according to claim 1, further comprising an interface (110) configured to receive a request to monitor said connectivity service and output a report of the performed measurement.

4. The apparatus of claim 3, further comprising a filtering unit (140), the filtering unit configured to filter the result of said measurement of said measurable parameters.

5. The apparatus (100) according to claim 1, wherein said Service Definition further comprises defined intervals for said measurable parameters.

6. The apparatus of claim 5, wherein said obtaining unit (120) is further configured to select a parameter within said set of measurable parameters to measure, and wherein said measuring unit (130) is further configured to measure said selected parameter between said Measurement Points using said at least one tool.

7. The apparatus (100) according to claim 1, wherein said obtaining unit (120) is further configured to select a parameter within said set of measurable parameters to measure, and wherein said measuring unit (130) is further configured to measure said selected parameter between said Measurement Points using said at least one tool.

8. A computer implemented method (200) for monitoring a connectivity service in a plurality of transport network types, the method comprising:
    requesting and obtaining (210), with regard to a type of the transport network, a Service Definition and Measurement Points, MPs, for said connectivity service to be monitored, said Service Definition comprising a set of measurable parameters,
    requesting and obtaining (220) a mapping of each of said measurable parameters to Operation Administration and Maintenance functions, OAM-functions, of the connectivity service, the OAM-functions corresponding to a protocol which is dependent on the transport network type;
    requesting and obtaining (230) a mapping of said measurable parameters and OAM-functions to which at least one tool to use for measuring said measurable parameters of said connectivity service;
    requesting and obtaining said Service Definition and Measurement Points from a Service Database;
    requesting and obtaining said mapping of measurable parameters to functions from a Function Database;
    requesting and obtaining said mapping of parameters and functions to the at least one tool to use for measuring from a Tool Database; and
    measuring (240) said parameters between said Measurement Points using said at least one tool.

9. The method according to claim 8, further comprising filtering the results of said measurements.

10. The method (200) according to claim 8, further comprising receiving a request to monitor said connectivity service and wherein a report of the performed measurements is provided in response to receiving said request to monitor said connectivity service.

11. The method of claim 10, further comprising filtering the results of said measurements.

12. The method according to claim 8, wherein monitoring of said connectivity service comprises measuring (240) said measurable parameters between said Measurement Points using said at least one tool and comparing the measured parameters to defined intervals comprised in said Service Definition.

13. The method of claim 12, further comprising selecting a parameter within said set of measurable parameters to measure and measuring said selected parameter between said Measurement Points using said at least one tool.

14. The method according to claim 8, further comprising selecting a parameter within said set of measurable parameters to measure and measuring said selected parameter between said Measurement Points using said at least one tool.

15. The method according to claim 8, wherein at least one of said requesting and obtaining (210) a Service Definition and Measurement Points, MPs, for said connectivity service to be monitored, are performed towards a Service Database, requesting and obtaining (220) a mapping of each of said measurable parameters to OAM-functions, are performed towards a Function Database and wherein said requesting and obtaining a mapping of said measurable parameters and OAM-functions to which at least one tool to use for measuring said measurable parameters, are performed towards a Tool Database.

16. A non-transitory computer readable medium storing computer program instructions for monitoring a connectivity service in a plurality of transport network types, the computer program instructions, when executed by a computer processing unit, cause the computer processing unit to:
- request and obtain (210), with regard to a type of the transport network, a Service Definition and Measurement Points, MPs, for said connectivity service to be monitored, said Service Definition comprising a set of measurable parameters;
- request and obtain (220) a mapping of each of said measurable parameters to Operation Administration and Maintenance functions, OAM-functions, of the connectivity service, the OAM-functions corresponding to a protocol which is dependent on the transport network type;
- request and obtain (230) a mapping of said measurable parameters and OAM-functions to which at least one tool to use for measuring said measurable parameters of said connectivity service;
- request and obtain said Service Definition and Measurement Points from a Service Database;
- request and obtain said mapping of measurable parameters to functions from a Function Database;
- request and obtain said mapping of parameters and functions to the at least one tool to use for measuring from a Tool Database;
- select a parameter within said set of measurable parameters to measure; and measure said selected parameter between said Measurement Points using said at least one tool.

* * * * *

UNITED STATES PATENT AND TRADEMARK OFFICE
CERTIFICATE OF CORRECTION

Page 1 of 4

PATENT NO. : 9,148,354 B2
APPLICATION NO. : 13/699357
DATED : September 29, 2015
INVENTOR(S) : Johnsson et al.

It is certified that error appears in the above-identified patent and that said Letters Patent is hereby corrected as shown below:

On Page 2, in Item (56), under "OTHER PUBLICATIONS", in Column 2, Line 27, delete "D-4.3" and insert -- D-4.3. --, therefor.

In Column 1, Line 31, delete "(MPIS-TP)," and insert -- (MPLS-TP), --, therefor.

In Column 1, Line 49, delete "(SIA)" and insert -- (SLA) --, therefor.

In Column 1, Line 53, delete "SIAs," and insert -- SLAs, --, therefor.

In Column 2, Line 4, delete "SIA" and insert -- SLA --, therefor.

In Column 2, Line 11, delete "once" and insert -- Force --, therefor.

In Column 2, Line 13, delete "different" and insert -- different. --, therefor.

In Column 2, Line 20, delete "SIAs." and insert -- SLAs. --, therefor.

In Column 2, Line 24, delete "SIA" and insert -- SLA --, therefor.

In Column 2, Line 30, delete "SIA" and insert -- SLA --, therefor.

In Column 2, Line 49, delete "Point, MP." and insert -- Points, MPs. --, therefor.

In Column 2, Line 60, delete "Point" and insert -- Points --, therefor.

In Column 3, Line 7, delete "Point" and insert -- Points --, therefor.

In Column 3, Line 48, delete "measurement" and insert -- measurement. --, therefor.

Signed and Sealed this
Nineteenth Day of April, 2016

Michelle K. Lee
*Director of the United States Patent and Trademark Office*

In Column 3, Line 67, delete "which" and insert -- which: --, therefor.

In Column 4, Line 23, delete "sewers" and insert -- servers --, therefor.

In Column 4, Line 35, delete "SIA(s)," and insert -- SLA(s), --, therefor.

In Column 4, Line 49, delete "MR." and insert -- MPs. --, therefor.

In Column 4, Line 60, delete "measurement" and insert -- measurement. --, therefor.

In Column 5, Line 6, delete "SIA" and insert -- SLA --, therefor.

In Column 5, Line 7, delete "question" and insert -- question. --, therefor.

In Column 5, Line 11, delete "Point." and insert -- Points. --, therefor.

In Column 5, Line 20, delete "le the" and insert -- RTT. If the --, therefor.

In Column 5, Line 21, delete "then the" and insert -- then the RTT --, therefor.

In Column 5, Line 23, delete "Point," and insert -- Points, --, therefor.

In Column 5, Line 38, delete "SIA" and insert -- SLA --, therefor.

In Column 5, Line 44, delete "packet and to report measurement result." and insert -- packets and to report measurement results. --, therefor.

In Column 6, Line 6, delete "networking" and insert -- interworking --, therefor.

In Column 6, Line 15, delete "SIAs" and insert -- SLAs --, therefor.

In Column 6, Lines 24-25, delete "interface 100" and insert -- interface 110 --, therefor.

In Column 6, Line 30, delete "SIAs." and insert -- SLAs. --, therefor.

In Column 6, Line 33, delete "SIA" and insert -- SLA --, therefor.

In Column 6, Line 37, delete "SIA" and insert -- SLA --, therefor.

In Column 6, Line 44, delete "SIA" and insert -- SLA --, therefor.

In Column 6, Line 45, delete "SIA," and insert -- SLA, --, therefor.

In Column 6, Line 61, delete "interest" and insert -- interest. --, therefor.

CERTIFICATE OF CORRECTION (continued)
U.S. Pat. No. 9,148,354 B2

In Column 7, Line 30, delete "SIA" and insert -- SLA --, therefor.

In Column 7, Line 31, delete "SIA" and insert -- SLA --, therefor.

In Column 7, Line 34, delete "itself" and insert -- itself. --, therefor.

In Column 7, Line 48, delete "flames," and insert -- Frames, --, therefor.

In Column 7, Line 56, delete "SIA" and insert --SLA --, therefor.

In Column 7, Line 61, delete "that" and insert -- that, --, therefor.

In Column 7, Line 65, delete "Bandwidth" and insert -- Bandwidth: --, therefor.

In Column 7, Line 67, delete "flame" and insert -- Frame --, therefor.

In Column 8, Line 10, delete "Point" and insert -- Points --, therefor.

In Column 8, Line 26, delete "Flame" and insert -- Frame --, therefor.

In Column 8, Line 36, delete "Point," and insert -- Points, --, therefor.

In Column 8, Line 46, delete "Point" and insert -- Points --, therefor.

In Column 8, Line 63, delete "SIA" and insert -- SLA --, therefor.

In Column 9, Line 26, delete "arrangement" and insert -- arrangement. --, therefor.

In Column 9, Line 30, delete "Point," and insert -- Points, --, therefor.

In Column 9, Line 35, delete "Point," and insert -- Points, --, therefor.

In Column 9, Line 46, delete "Point." and insert -- Points. --, therefor.

In Column 10, Line 5, delete "410460" and insert -- 410-460 --, therefor.

In Column 10, Line 6, delete "likewise," and insert -- Likewise, --, therefor.

In Column 10, Line 26, delete "likewise," and insert -- Likewise, --, therefor.

In Column 10, Line 37, delete "P" and insert -- P. --, therefor.

In Column 10, Line 45, delete "MIS" and insert -- MPs --, therefor.

In Column 12, Line 15, delete "Point," and insert -- Points, --, therefor.

In Column 12, Line 19, delete "arrangement" and insert -- arrangement. --, therefor.

In Column 12, Line 21, delete "product" and insert -- product, --, therefor.

In Column 13, Line 2, delete "unit" and insert -- units --, therefor.

In Column 13, Line 6, delete "unit." and insert -- units. --, therefor.